(12) United States Patent
Kjellman

(10) Patent No.: US 11,602,218 B2
(45) Date of Patent: Mar. 14, 2023

(54) GLUED FURNITURE BASE

(71) Applicant: AF Solutions Ab Oy, Jakobstad (FI)

(72) Inventor: Fredrik Kjellman, Jakobstad (FI)

(73) Assignee: AF Solutions Ab Oy, Jakobstad (FI)

( * ) Notice: Subject to any disclaimer, the term of this patent is extended or adjusted under 35 U.S.C. 154(b) by 503 days.

(21) Appl. No.: 16/611,235

(22) PCT Filed: May 14, 2018

(86) PCT No.: PCT/FI2018/050359
§ 371 (c)(1),
(2) Date: Nov. 6, 2019

(87) PCT Pub. No.: WO2018/211172
PCT Pub. Date: Nov. 22, 2018

(65) Prior Publication Data
US 2020/0154886 A1    May 21, 2020

(30) Foreign Application Priority Data

May 15, 2017  (FI) ..................................... 20175439

(51) Int. Cl.
*A47B 91/00* (2006.01)
*A47C 7/00* (2006.01)
*F16B 12/08* (2006.01)
*A47B 13/02* (2006.01)

(52) U.S. Cl.
CPC ............ *A47B 91/005* (2013.01); *A47C 7/004* (2013.01); *F16B 12/08* (2013.01); *A47B 2013/025* (2013.01); *A47B 2200/0021* (2013.01)

(58) Field of Classification Search
CPC ....... A47B 91/00; A47B 91/005; A47B 91/08; A47B 2013/025; A47B 2200/0021; A47C 7/004; A47C 7/002; A47C 7/00; F16B 12/08
USPC ......................... 248/188.1, 188, 188.8, 188.9
See application file for complete search history.

(56) References Cited

U.S. PATENT DOCUMENTS

| | | | | |
|---|---|---|---|---|
| 2,217,754 A * | 10/1940 | Johnson | ................. | A47C 7/004 248/188.7 |
| 3,153,524 A | 10/1964 | Greenfield et al. | | |
| 3,405,897 A * | 10/1968 | Bond | ..................... | A47C 7/004 248/188.7 |
| 3,443,782 A * | 5/1969 | Fields | .................... | A47C 7/004 248/188.7 |

(Continued)

FOREIGN PATENT DOCUMENTS

| | | |
|---|---|---|
| AT | 508447 A2 | 1/2011 |
| CA | 2186291 A1 | 4/1998 |

(Continued)

*Primary Examiner* — Nkeisha Smith
(74) *Attorney, Agent, or Firm* — Laine IP Oy

(57) ABSTRACT

The invention is directed to a base for chairs or tables having at least one centrally located column structure. Specifically, the invention is directed to a base composed of several parts, comprising a hub and load-carrying arms radiating therefrom. According to the invention, each arm is separately manufactured and provided with a cavity at least at its proximal end and is individually joined to protrusions on the hub which are inserted into said cavities, and the joint between arms and protrusions is glued.

10 Claims, 3 Drawing Sheets

(56) References Cited

U.S. PATENT DOCUMENTS

| | | | | |
|---|---|---|---|---|
| 3,617,023 A | * | 11/1971 | Schneiderman | F16M 11/42 248/188.7 |
| 3,682,425 A | * | 8/1972 | Vincent | A47C 7/004 248/188.7 |
| 3,705,704 A | * | 12/1972 | Textoris | A47C 7/004 248/188.7 |
| 3,801,054 A | | 4/1974 | Glowacki | |
| 3,877,669 A | | 4/1975 | Ambasz | |
| 4,084,776 A | * | 4/1978 | Cook | A47C 7/004 248/188.7 |
| 4,262,871 A | * | 4/1981 | Kolk | A47C 7/006 248/188.7 |
| 4,534,533 A | * | 8/1985 | Doerner | A47C 7/004 248/345.1 |
| 5,402,973 A | * | 4/1995 | Haines | A47C 7/004 248/188.7 |
| 5,673,892 A | * | 10/1997 | Kjellman | A47C 7/004 248/188.7 |
| 5,752,684 A | * | 5/1998 | Larkin | A47C 7/004 248/188.7 |
| 5,906,343 A | * | 5/1999 | Battey | A47C 7/006 248/188.7 |
| 5,938,156 A | * | 8/1999 | Kao | A47C 7/004 248/188.7 |
| 6,412,745 B1 | * | 7/2002 | Yokoyama | A47B 95/008 52/287.1 |
| 6,626,404 B2 | * | 9/2003 | Kleinikel | A47C 7/004 248/188.7 |
| 7,032,869 B2 | * | 4/2006 | Edwards | A47C 7/004 248/188.7 |
| 7,188,811 B2 | * | 3/2007 | Liviero | A47C 7/004 248/188.7 |
| 8,876,071 B2 | * | 11/2014 | Brooke | A47B 91/16 248/188.8 |
| 2011/0095144 A1 | * | 4/2011 | Crampton | E04F 21/0023 248/122.1 |
| 2013/0193909 A1 | * | 8/2013 | Blevins | F16M 11/10 248/163.1 |
| 2015/0122958 A1 | * | 5/2015 | Chen | A47C 7/004 248/158 |

FOREIGN PATENT DOCUMENTS

| | | |
|---|---|---|
| CN | 1882269 A | 12/2006 |
| CN | 201101287 Y | 8/2008 |
| CN | 201197509 Y | 2/2009 |
| CN | 202681203 U | 1/2013 |
| CN | 204218395 U | 3/2015 |
| GB | 1398374 A | 6/1975 |
| GB | 2441966 A | 3/2008 |
| WO | WO8605373 A1 | 9/1986 |

\* cited by examiner

GLUED FURNITURE BASE

The invention is directed to a base for chairs or tables having at least one centrally located column structure. Particularly, the invention is directed to a base assembled from several parts, comprising a hub and load-carrying arms protruding therefrom. Further the invention is directed to a method for manufacturing a base for chairs or tables.

BACKGROUND

Chairs having a centrally located column are common in particular as office chairs, but also for private use when the chair is to be rotatable where it stands. Such chairs may be provided with various mechanisms for rotation and tilt, gas or spring suspension in the column, among others. A prerequisite for such a chair is a steady base structure with or without wheels for moving around.

Also tables may be provided with one or more columns, for example along their centerline whereby the legs are not a hindrance for those seated at the table. A central location is not necessary as long as the table is steady, as e.g. in school desk-type furniture.

For permanently located furniture, a base plate in the form of a disc is useful. In particular for wheeled office chairs, a star-shaped base is used, having a central hub in which the lower end of the column is disposed, and a number of arms radiating from the hub. The arms rest on the floor and constitute carrying parts for the load that is applied to the chair. This design provides numerous opportunities to give the chair an esthetically pleasant appearance.

The number of arms may vary, but the great majority of chairs are designed with five arms.

The conventional solution for producing a steady and robust furniture base is to design it as a single piece, e.g. by moulding from plastic or metal. Assembly by welding is another option. Thereby, the arms are often tubular.

In U.S. Pat. Nos. 3,153,524 and 3,801,054 as well as patent application publications WO 86/05373 and US 2015/0122958 are disclosed furniture base structures comprising a hub with slots and arms with protrusions for fitting to the hub by means of form-fitting type joints, or compression joints having an axially tightening bolt.

In U.S. Pat. No. 4,084,776 is disclosed a furniture base having hollow arms to be attached to the hub by welding. To the lower end of the hub is fastened an element which, apart from being welded, is provided with hook-shaped protrusions engaging the underside of the arms, in order to distribute the vertical load.

In U.S. Pat. No. 3,877,669 is disclosed a furniture base assembled from tubular components. Glue is used for fixing insert parts in the assembly stage, and for fastening non-loaded struts connecting vertical columns.

In GB patent 2 441 966 is disclosed a furniture base assembled from a hub having protrusions and tubular arms attached over the protrusions. The protrusions are cleaved by slits and provided with screws which can be tightened through openings in the arms, whereby the protrusions spread and thus fix the arms.

DISCLOSURE OF THE INVENTION

The present invention is directed to providing a furniture base and a method of manufacturing a furniture base, which method allows for great flexibility in the manufacturing process. According to the method of the invention, the hub and the load-carrying arms are joined thus, that protrusions on the hub are enclosed by hollows in the arms, and the joint is glued.

In the following, expressions for describing the type of furniture base to which the invention is directed are defined.

The hub is a body located centrally in the base, which can be cylindrical or have a number of planar sides usually corresponding to the number of arms protruding from the hub. The hub may be tubular or conical, and in chair bases it usually has a cavity for receiving a swivel allowing for rotation of the column structure supporting the seat of the chair, or in nonrotating structures for receiving the lower end of the column.

The axial direction is the direction of the vertical central axis of the hub.

A radial direction is a direction essentially in the horizontal plane and perpendicular to the axial direction. Depending on the construction, deviations from the horizontal plane may occur.

Up and down refer to the directions when the furniture base is in its operational position, also called the assembled state.

The meaning of the expression load-carrying arms is that the relevant part, including the joints that fasten it to adjoining parts of the structure, as the relevant piece of furniture is symmetrically loaded by an external weight is subjected to a force essentially corresponding to the total load divided by the number of arms.

The strength of load-carrying parts and the strength of the joints holding them together are essential for the load carrying capacity of the structure. Furniture bases are preferably tested according to industry standards issued by e.g. the BIFMA. A furniture base according to the invention has a load carrying capacity satisfying ANSI/BIFMA X5.1-2107, that is 1134 kg (2500 lb).

The proximal end of an arm is the end closest to the hub. The distal end is thus the opposite end which rests on what lies beneath.

According to the present invention, each load-carrying arm is manufactured separately with a cavity at least at its proximal end, and is individually joined to protrusions on the hub which protrusions are received in said cavities, and the joint between arm and protrusion is glued.

The hub may be manufactured from metal or a plastic material. The protrusions on a plastic hub may be compact or structured. The protrusions on a metal hub may be solidly moulded or bent from sheet metal and fastened to the hub by welding.

According to an embodiment, the hub is manufactured from composite plastic, e.g. by injection moulding.

According to an embodiment, the hub is manufactured from aluminium, e.g. by die casting.

According to an embodiment, the hub is manufactured from steel. The manufacturing can, for example, be carried out by the welding together of a tubular component and bent components.

According to a preferable embodiment, the arms are manufactured by bending sheet metal, preferably steel sheet, the thickness of which may advantageously be 2 mm. The arm is bent to a U or C profile and can preferably be subsequently bent to provide a longitudinal curvature. This curvature may be concave or convex relative to the operational position. The profile may be open downwards or upwards relative to the position of the arm in the completed furniture base. That the profile is open means that it has a longitudinal slit between the sheet edges, which consequently are not joined together. When the embodiment having the upward open profile is used, the cavity may be covered using cover plates of various materials which may differ from the material of the arm. Thus, great variation in e.g. colour and surface structure is possible.

The arms in a furniture base according to the present invention may also be mould cast from aluminium or plastic materials; also plastic composite materials, e.g. fiberglass-reinforced polyamide are possible.

Preferably, the protrusions have essentially a shape corresponding to the part of the cavities in the arms into which the protrusions are fitted. Preferably, each protrusion has a length corresponding to 10 to 50% of the length of the arm; advantageously, each protrusion has a length corresponding to 10 to 40% of the length of the arm; more advantageously, each protrusion has a length corresponding to about a third of the length of the arm.

Advantageously, the glue fills an essential part of the space between the protrusion and the inner surface of the arm. When the amount of glue is optimal, the joint is solid and no movement which might give rise to noise occurs between arms and hub. The glue may be applied before the arms and the hub are joined, alternatively injected following the joining. According to an embodiment, at least some of the parts, hub and/or arms, are provided with at least one opening for injection of glue.

A glue is used having appropriate adhesive properties for the involved materials. For example, dual component-based epoxy and polyurethane resins may be used.

According to another aspect of the invention, a method is provided for manufacturing a furniture base, the method comprising:

manufacturing a hub having a number of protrusions, the number of protrusions corresponding to the number of arms with which the hub is to be provided;

load-carrying arms are manufactured from metal or plastic, the arms being provided with cavities for receiving the protrusions, after which either the protrusions are inserted into the cavities, after which glue is pressed into the joint between protrusion and arm, or glue is applied to the protrusions or the arms after which the protrusions are inserted into the cavities.

According to an embodiment of the method according to the invention, a blank for an arm is manufactured from sheet metal, the blank is bent to an arm having a U profile; optionally, the edge of the U-profile is bent resulting in a C profile; optionally, the arm is bent in order to give it a longitudinal curvature.

The blanks for the arms are preferably prepared from flat sheet metal using conventional methods such as blanking or shearing using e.g. plasma, laser or water jet.

The invention is described in greater detail below referring to the attached drawings, in which FIG. 1 is a perspective view of a hub according to an embodiment of the invention.

Figure 1:
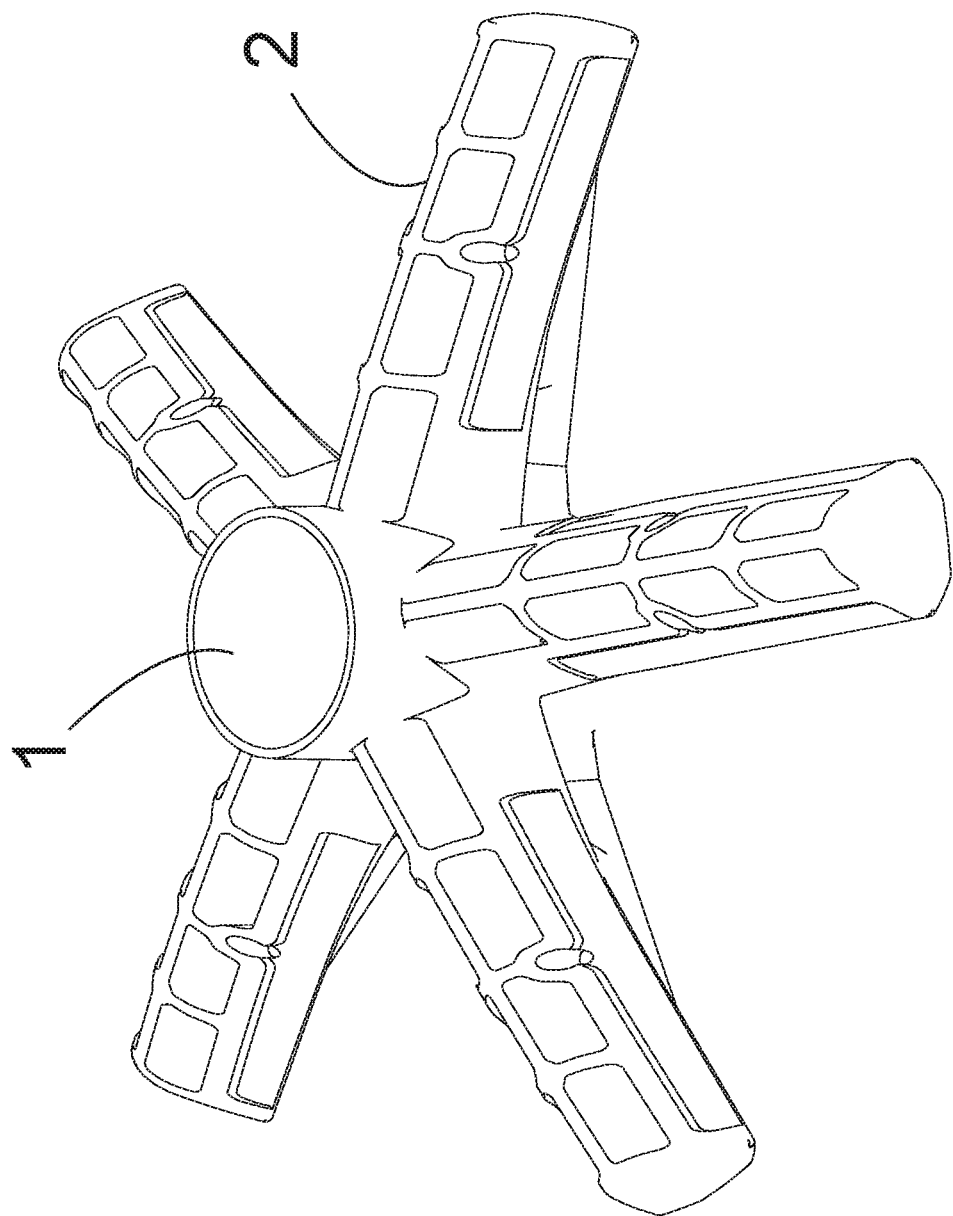

In FIG. 1 is shown a hub made from a plastic material. The hub has a central part 1 having an essentially cylindrical recess for receiving a column support, advantageously provided with a swivel for rendering the chair seat rotatable. In this embodiment, from the central part 1 five protrusions 2 radiate, for inserting into cavities in the load-carrying arms which are to rest on the plane underneath.

Figure 2:
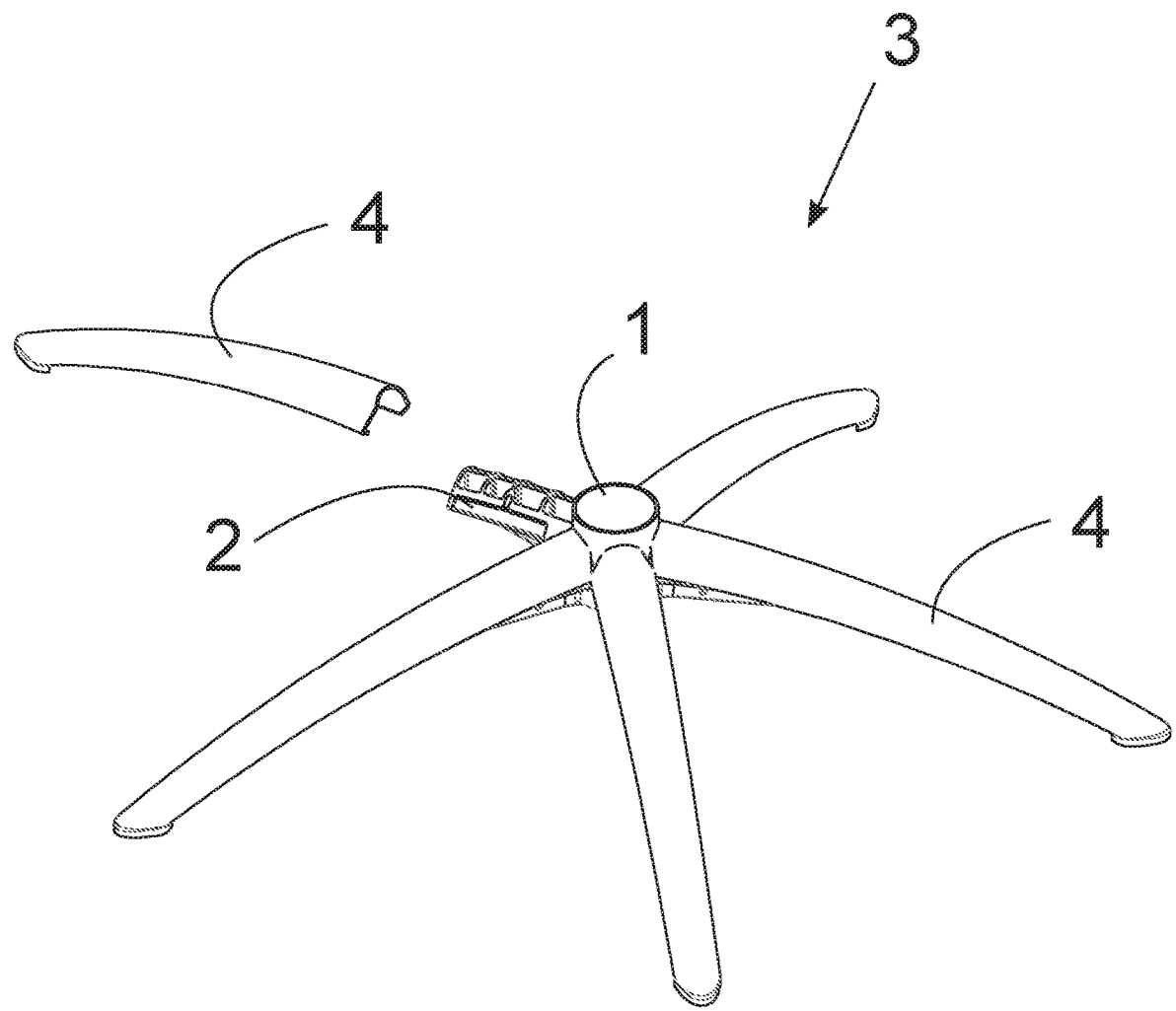
FIG. 2 is a perspective view of a preferable embodiment of the invention, in which the arms are made from sheet metal bent into a C-profile which is open downwards.

In FIG. 2 is shown a furniture base 3 having five load-carrying arms 4 which are joined to a hub. The hub is provided with protrusions 2 which during assembly are inserted into cavities 5 in the arm structures. In FIG. 2, the arms 4 are manufactured from sheet metal which has been bent to a C-profile and provided with a curvature. In the assembly process, the sheet metal profile will enclose the protrusions 2.

Figure 3:
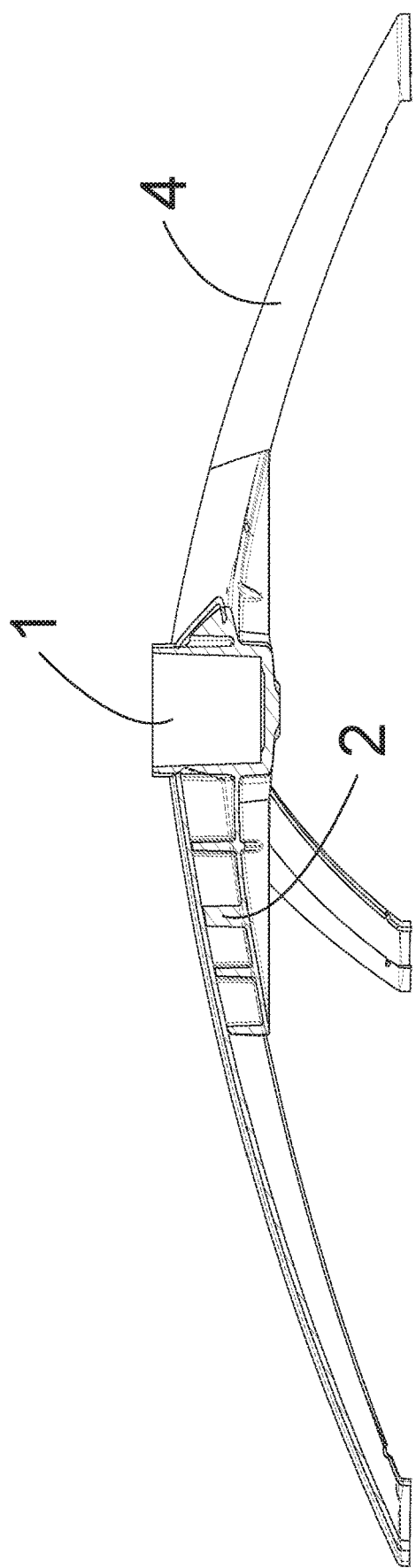
FIG. 3 is a partial section of an embodiment of the invention.

An appropriate amount of glue is preferably applied to the upper and side surfaces of the protrusions in the assembly process, so the glue fills the space between the protrusion and the inner surface of the arm, and no play between the parts is present when these are joined; this ensures that no shearing noises occur when a load is applied to the furniture base. In FIG. 3 is shown a section of a protrusion surrounded by an arm. Glue is applied to appropriate facing surfaces.

The present invention provides advantages in the manufacturing process, among others. In relation to furniture bases moulded in one piece, surface finishing operations like chrome plating, polishing and coating are significantly easier to carry out when the arms are separate, thin and longitudinal objects. Assembly using glue facilitates uncomplicated manufacturing operations. For example, the arms may be powder coated prior to assembly.

The features described above may be freely combined with each other within the scope of the invention defined by the claims.

The invention claimed is:

1. A base for furniture having a central column structure, the base comprising:
   a central hub; and
   a plurality of load-carrying arms radially extending from the central hub;
   wherein the central hub further comprises a plurality of protrusions extending radially from the central hub, and wherein a number of the plurality of protrusions corresponds to a number of load-carrying arms;
   wherein a proximal end of each of the load-carrying arms comprises a cavity, and wherein the radially extending protrusions are inserted into the cavities and, upon insertion, define spaces between each radially extending protrusion and a respective load-carrying arm;
   wherein the spaces are filled with an adhesive for securing the load-carrying arms to the central hub, by applying the adhesive to the upper and side surfaces of the radially extending protrusions so the adhesive fills the spaces between the radially extending protrusions and an inner surface of the load-carrying arms;
   wherein the cavity of each load-carrying arm comprises an upward facing opening,
   wherein the load-carrying arms each comprise a U-shaped or a C-shaped profile defining the upward facing opening, and wherein the upward facing openings face upwards in a direction towards a top surface of the base upon insertion of the radially extending protrusions into the upward facing openings, and
   wherein the furniture base further comprises separate covering elements positionable over the upward facing openings to cover at least a portion of the upward facing openings.

2. The furniture base according to claim 1, wherein the load-carrying arms are manufactured from a sheet metal blank.

3. The furniture base of claim 1, further comprising the central column structure extending from a cavity of the base and a seat associated with the central column structure, wherein the separate covering elements provide a different visual appearance relative to the seat.

4. The furniture base according to claim 1, wherein at least one of the central hub or load-bearing arms comprises at least one opening for introduction of the adhesive there through.

5. The furniture base according to claim 1, wherein the adhesive comprises an epoxy or polyurethane resin.

6. The furniture base according to claim 1, wherein each radially extending protrusion from the central hub has a length that is from 10 to 50% of a length of a corresponding one of the load-carrying arms.

7. A chair comprising the base according to claim 1, a seat, and a central column structure extending from the seat.

8. The chair according to claim 7, further comprising a swivel for allowing rotation of the central column, and wherein the base further comprises a cavity for receiving the central column or the swivel therein.

9. A method of manufacturing a furniture base for furniture having a central column structure, the method comprising:
   providing a central hub comprising a plurality of protrusions extending radially from the central hub;
   providing a plurality of load-carrying arms, wherein at least a proximal end of each of the load-carrying arms comprises a cavity, and wherein a number of the load-carrying arms corresponds to the number of protrusions;
   inserting the protrusions extending radially from the central hub into the cavities of the load-carrying arms, wherein, upon insertion, spaces are defined between the radially extending protrusions and an inner surface of the load-carrying arms; and
   filling the spaces with an adhesive for securing the load-carrying arms to the central hub;
   wherein the providing the plurality of load carrying arms comprises, for each arm:
   forming a blank from sheet metal;
   bending the blank to form a respective load-carrying arm having a U-shaped profile;
   bending edges of the U-shaped profile to form a C-shaped profile; and
   providing in the load-carrying arm a longitudinal curvature.

10. The method according to claim 9, wherein the central hub and the plurality of load-carrying arms are manufactured separately.

\* \* \* \* \*